Feb. 24, 1959  S. L. GOOKIN  2,874,864
WORK INDEXING MECHANISM FOR FASTENER INSERTING MACHINES
Filed Feb. 23, 1956  3 Sheets-Sheet 1

Inventor
Sylvester L. Gookin
By his Attorney
Thomas J. Ryan

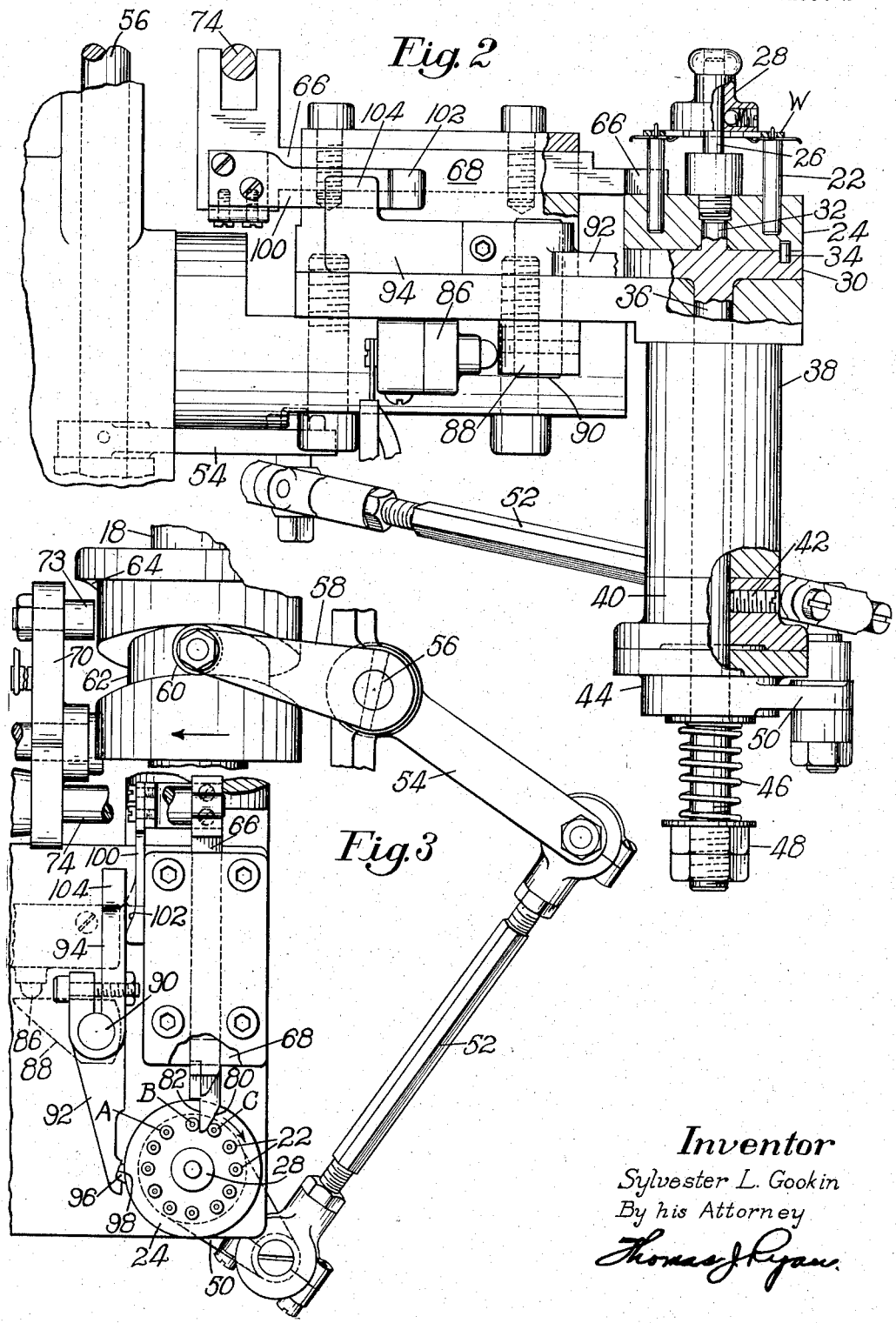

Feb. 24, 1959  S. L. GOOKIN  2,874,864
WORK INDEXING MECHANISM FOR FASTENER INSERTING MACHINES
Filed Feb. 23, 1956  3 Sheets-Sheet 3
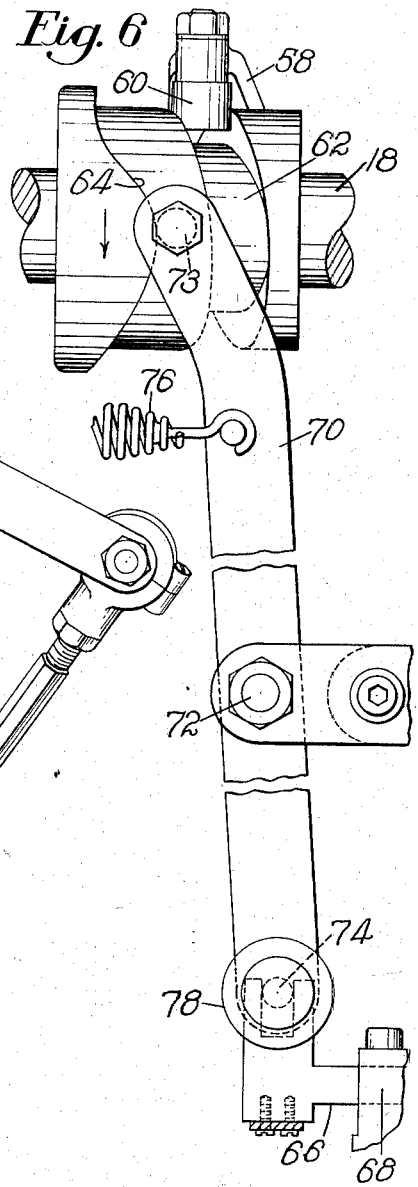
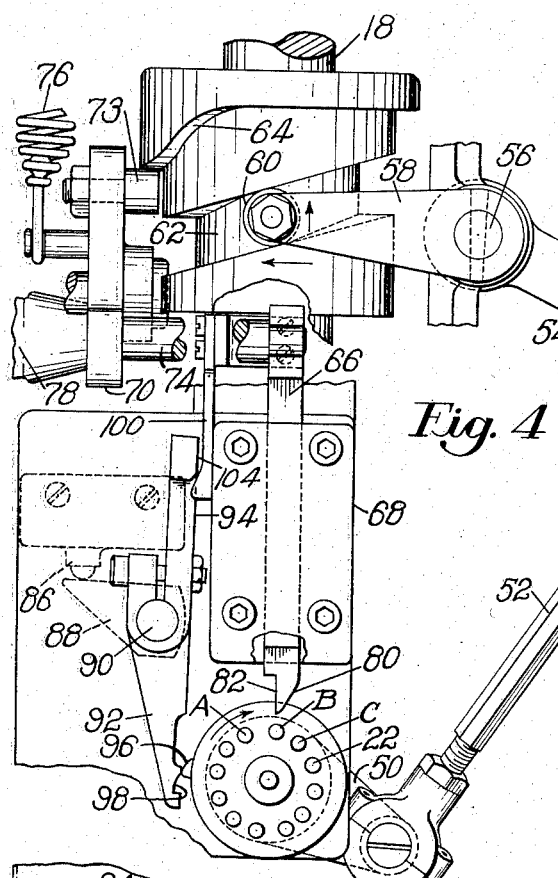
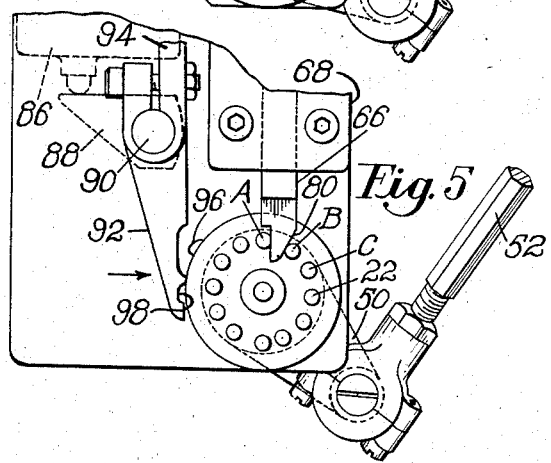
Inventor
Sylvester L. Gookin
By his Attorney
Thomas J. Ryan

United States Patent Office 2,874,864
Patented Feb. 24, 1959

2,874,864
WORK INDEXING MECHANISM FOR FASTENER INSERTING MACHINES

Sylvester L. Gookin, Cohasset, Mass., assignor to United Shoe Machinery Corporation, Flemington, N. J., a corporation of New Jersey Application February 23, 1956, Serial No. 567,335

3 Claims. (Cl. 218—15)

This invention relates to machines adapted to insert a series of fasteners, such as eyelets, into a work piece wherein the fasteners must be inserted precisely in accordance with a specified space grouping pattern. In particular, the invention relates to automatic mechanism for progressively indexing a work piece, in step-by-step manner, accurately to position each fastener receiving location in operative alinement with a fastener inserting tool, even though the space grouping requirements may vary between different adjacent fasteners of the series to be inserted.

Heretofore no difficulty has been experienced in providing automatic machinery for indexing work pieces wherein the inserted fasteners are to be symmetrically arranged in a circular pattern having a uniform space grouping between all adjacent fasteners. Under such circumstances a work piece may be intermittently indexed an equal amount a succession of times until all the fasteners have been inserted. This may be accomplished readily by mounting the work piece on a rotatable work holder in the form of a turntable arranged so that upon rotation each fastener receiving location will be brought successively into operative alinement with the fastener inserting tool. Where all that is required is that the spacing between adjacent fasteners be equidistant, the requisite increment of work feed may be imparted uniformly to the work holder between each operative stroke of the tool by various well-known intermittent positive drive means, such as direct gearing, ratchet and pawl, or a Horton-type clutch arrangement.

Where, however, the work holder must intermittently be advanced distances which may vary from step to step between fastener inserting strokes of the tool in order to satisfy the space grouping requirements of a particular work piece, the problem of properly positioning the fastener receiving points on the work piece in operative relation with the tool has heretofore precluded the employment of automatic means for indexing the work holder, and has required that the work piece be manually presented to each operation of the fastener inserting tool. One instance where it has heretofore been necessary manually to locate the fasteners in the work piece is in the manufacture of electronic selector switch components, such as the work piece assembly illustrated in my United States Patent No. 2,630,935, wherein numerous switch contact elements must be secured to a disk-like work piece in a circular series having varying space groupings between adjacent elements. Each element is individually mounted upon and secured to the work piece by an eyelet fastener inserted into and set in a pre-formed hole through the work piece. Since the disk-like work pieces are frequently small, having a diameter of approximately one and a half inches, and since a dozen or more contact elements are usually required to be fastened to each work piece, it can readily be perceived that the contacts, the fasteners, and the fastener receiving apertures, are all so minute as to require much precision in order to assure that, during each fastener inserting operation, the drilled or punched apertures which define each fastener inserting point are all positioned in accurate alinement with the operative path of the fastener inserting tool. Also, due to the minute and delicate nature both of the parts being operated upon and of the fastener inserting tool itself, adequate means must be provided to stop the operation of the machine as soon as the required number of fasteners have been inserted, because continued operation of the machine (tending to insert a second fastener in the place of a fastener already inserted) would damage both the work piece and the fastener inserting mechanisms.

One of the objects of this invention is to provide automatic means adapted to set rapidly, one at a time, a series of fasteners in a work piece having a series of preformed apertures at variously spaced-apart intervals for the reception of said fasteners.

Another object of the invention is to provide automatic means for stopping the actuation of the machine when all of the preformed apertures in the work piece have been provided with a fastener.

Another object of the invention is to provide an automatic machine adapted to operate upon work pieces having varying requirements as to both the number of fasteners to be inserted and the space grouping to be provided between adjacent fasteners.

Accordingly, a feature of this invention is the provision of a work holder, having the same fastener space grouping requirements as those of a given type of work piece, adapted supportingly to receive the work pieces which are preassembled on the work holder before the automatic operation of the fastener inserting machine is commenced. Also, the work holder is adapted to hold the work piece so that an anvil member will be properly disposed at each location where a fastener is to be inserted by a tool when the spaced-apart anvil members are each in succession moved into operative alinement with the tool.

Another feature of the invention is that releasable means are provided for firmly clamping a work piece upon the work holder so that pressure of the tool directed against one portion of the work piece will not cause the work piece to be tilted to one side.

A further feature of the invention is the provision of motion limiting detent means adapted intermittently to engage the work holder and, when the holder has been indexed to position one of the anvils in registry with the tool, to lock the holder and work piece in fastener receiving position preparatory to the actuation of the tool.

Another advantageous feature of the invention is that, after a fastener has been inserted at one of the required points and after the motion limiting detent member has been withdrawn from locking engagement with the holder, the holder is moved by a yieldable power drive in a direction to bring the next adjacent fastener receiving point into alinement with the tool, whereupon the detent again takes over to lock the holder and work piece in operative position for the next fastener inserting operation. It will be clear from the detailed description herein following that the above detent and yieldable drive features cooperate with each other and with the work holder in time relation so that, regardless of any variation in the space grouping between any of the series of fastener receiving points, the holder and work are advanced between each operative stroke of the tool the exact amount required to locate the various points in proper fastener receiving position with respect to the tool.

The above and other objects and features of the invention will appear from the following detailed description of the preferred embodiment thereof illustrated in the accompanying drawings, and will be pointed out in the claims.

In the drawings,

Fig. 2 is a left side elevation, partially broken away and in section, showing the means for indexing a work piece;

Fig. 3 is a top plan view of the mechanism for indexing the work piece, the parts being therein illustrated in the at rest position of the machine;

Figs. 4 and 5 are views similar to Fig. 3, but illustrating subsequent phases in the operation of the indexing mechanism; and Fig. 6 is a left side elevation of the mechanism for controlling part of the indexing mechanism.

Figure 1:
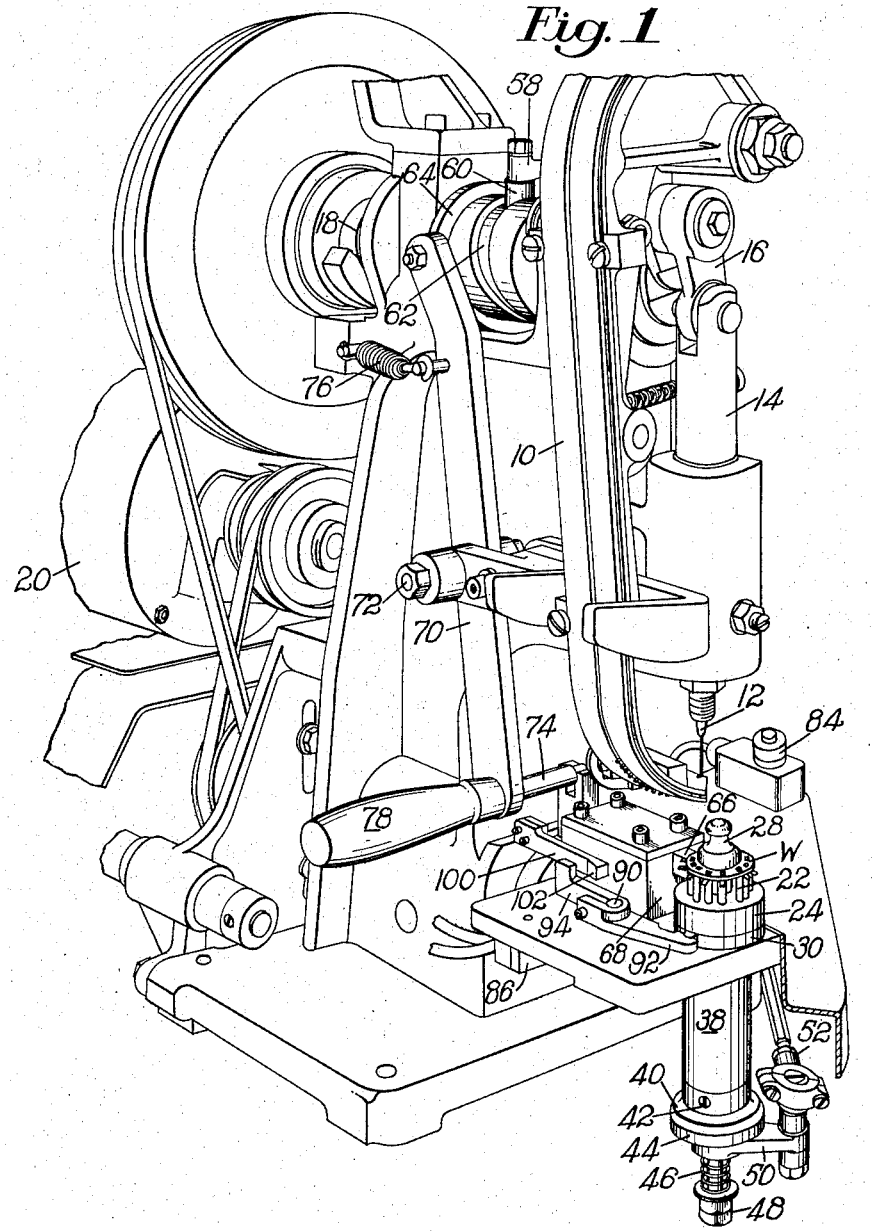
Fig. 1 is a perspective view of a fastener inserting machine illustrating one embodiment of the invention.

Referring to the drawings, and in particular to Fig. 1, for the purpose of illustration the invention has been shown as applied to a step-by-step eyelet inserting machine of a well-known type having a raceway 10 for supplying eyelet fasteners one at a time to a power operated fastener inserting tool 12 which is reciprocably operated in a fixed vertical path by a plunger 14 connected by a pitman 16 to a main power shaft 18 which in turn is driven, through a clutch (not shown), by a motor 20. Since the construction of the clutch mechanism does not constitute a feature of the present invention, it will not be described other than to say that a stop and start clutch mechanism arranged in accordance with that illustrated and described in United States Letters Patent No. 2,056,316, granted October 6, 1936, in my name, would be suitable. It is to be noted that in the machine construction of said patent the fastener inserting instrumentalities are actuated for continuous repetitious operation as long as a clutch engaging control rod (numbered 68 in said patent) is retained in a depressed position with the result that a series of fasteners (one for each revolution of the machine) may be inserted in rapid sequence. In order to stop the machine when the required number of fasteners have been inserted, the above-mentioned control rod 68 is released; whereupon a spring (numbered 71 in said patent) elevates the rod automatically to disengage the clutch and stop the machine at a certain point in its cycle when the fastener inserting tool is fully retracted away from the work piece so that the work pieces may be readily inserted or removed from the machine. That is to say, after the clutch control rod is released the machine will still continue to complete that portion of the cycle required to bring the machine to its normal at rest position. As will become clear from the detailed description hereinafter following, the control rod for starting and stopping the actuation of the present machine, instead of being depressed by a manual treadle, as in the above patent, is depressed by the actuation of an electric solenoid which remains energized until the last fastener of the required number is being inserted; whereupon the electrical circuit is automatically interrupted by the shifting of a microswitch with the result that the control rod is then elevated by a spring to disengage the clutch and stop the machine in its idle position, as illustrated in Fig. 1, wherein the tool 12 is retracted away from the work piece W.

In the preferred embodiment, as best illustrated in Fig. 2 the work piece W is operatively positioned in the machine and supported on the work holder by a circular series of upstanding anvil members 22, each having a central pilot portion adapted to project upward through one of the apertures formed in the work piece. These anvils 22 are arranged in a spaced-apart grouping corresponding to the space grouping of the fastener receiving apertures in the work piece, and each anvil is rigidly attached at its lower end to a base mounting plate 24. A central stud 26 threaded into the plate 24 and extending upwardly a considerable distance above the anvils, is disposed concentric to the series of anvils 22, so that when the work piece W is properly oriented upon the anvils the upper portion of the stud 26 projects through a central opening provided in the work piece and extends above the level of the work piece. In the preferred embodiment the work piece W is firmly clamped upon the work holder by a flanged holddown sleeve 28 that fits over the stud 26 and is provided with a ball and spring friction grip arrangement to prevent accidental displacement of the assembled parts. The base mounting plate 24 of the work holder is attached to a turntable 30 having a centering lug 32 adapted to fit within a central opening in the bottom of the plate 24. The turntable is keyed to the work holder by a pin 34 fitted within an eccentric opening in the bottom of the plate 24. The turntable is rotatably mounted by an axial shaft 36 journaled through a frame-borne bracket 38. The turntable and shaft 36 are rotatably driven through a friction clutch assembly comprising a driven clutch member 40, secured to the shaft 36 by a set screw 42, and a driving clutch member 44 frictionally held in facing engagement with the member 40 by a spring 46 the force of which spring may be adjustably regulated by a nut 48 threaded on the lower extremity of the shaft 36. An oscillatory movement is intermittently imparted to the member 44 by a crank lever 50 which in turn is driven, through an adjustable ball joint connecting rod 52, by a lever 54 (Fig. 3) pinned on the lower end of a vertical rockshaft 56. The rockshaft 56 is journaled in the frame of the machine and is reciprocally driven by another lever 58 pinned on the upper end of the shaft 56 and provided at its free end with a cam follower roll 60 engaged with a cam groove 62 formed on the power shaft 18. The cam groove 62 is so designed and timed, with regard to the rotation of the power shaft 18, that each time the pitman 16 is actuated to withdraw the tool 12 from engagement with the work piece, a clockwise movement (as viewed in Figs. 3 and 4) is imparted to the rockshaft 56 which in turn causes an accompanying clockwise movement of the crank lever 50 and driving clutch member 44, tending frictionally to drive the turntable 30 in the direction of the arrow (Fig. 4). The actuation of the tool 12 and of the work holder are also coordinated, through a cam track 64 carried by the power shaft 18, to slide a motion limiting detent member 66 into and out of abutting engagement with portions of the work holder to control the degree of rotary movement that may be imparted frictionally to the holder each time the yieldable driving clutch member is actuated in a clockwise direction. The member 66 is mounted for reciprocal movement in a slide block 68 secured to the frame, and is actuated horizontally in a path transverse to the path of the tool 12, by the alternating movement of a double-armed lever 70 (Figs. 1 and 6). This lever is medially mounted by a pivot pin 72 affixed to a pivot bracket on the frame of the machine. The upper end of the lever 70 carries a cam follower roll 73 which is constantly urged against the track 64 of an open face cam by a tension spring 76. The lower end of the lever 70 is coupled by a tie rod 74 to the rear of the detent member 66, and is also provided with a handle 78 which, when manually moved rearwardly in the machine against the force of the spring 76, draws the member 66 rearwardly out of engagement with the work holder at any desired time, such, for instance, as when it is desired to remove the work holder from the turntable 30. The forward extremity of the member 66 is formed with a vertical wedge-like taper on one side face 80 providing a pointed nose where the face 80 meets a straight vertical side face 82 which extends parallel to the direction of movement of the member 66. In the preferred embodiment of the invention illustrated in the drawings, the nose of the motion limiting member 66 is adapted to be moved or projected forwardly by the force of the spring 76 until, after entering the space between any two adjacent anvil members 22, the nose becomes locked in wedging engagement with the sides of said anvil members (Fig. 3). It is to be noted that when the member 66 is carried forward by the spring 76 the nose of the member not only enters into the path of rotation of the anvils so that the face 82 acts as a detent for limiting movement of the work holder, but the forward movement of the tapered face 80 bearing against one of the pair of anvils serves as a cam to assist in rotating the work holder until the other of the pair of anvils abuts against the face 82 whereupon the work holder is locked against movement in either direction. When so locked, that anvil which is then abutting the straight side face 82 is positioned in axial alinement with the operative path of the fastening inserting tool 12, and, even though the driving clutch member 44 may not have completed its clockwise movement, the frictional drive acting upon the clutch member 40 will be ineffectual to move the work holder out of its then operative position. The locking force of the spring 76 is not relieved from the member 66 until after a fastener has been inserted by the tool 12 and until after the driving clutch member 44 has been rotated in a counterclockwise direction to place the member 44 in the position illustrated in Fig. 4. At this phase of the machine operation the cam follower roll 73 is engaged by the cam track 64 to rock the lever 70 against the force of the spring 76 and thereby withdraw the member 66 (Fig. 6) until the nose of the member is out of contact with that anvil member upon which a fastener has just been inserted. The duration of the withdrawal of the member 66 rearwardly beyond the path of rotation of the anvil members is brief; however, during the withdrawal movement (Fig. 4) the cam 62 commences to actuate the driving clutch member 44 in a clockwise direction so that as soon as the nose of the motion limiting member 66 is moved clear of the anvil adjacent the straight face 82, the work holder is frictionally rotated to carry said last-mentioned anvil clockwise beyond the plane of the face 82, so that, upon the forward return of the member 66 the tapered face 80 of the nose will engage said anvil and continue to cam the said anvil in a clockwise direction as the member 66 progressively slides forward until the next adjacent anvil toward the left is positioned in locking engagement against the face 82 as illustrated in Fig. 5. Thus the work holder has been indexed by one complete cycle of the machine, through the phases sequentially illustrated in Figs. 3, 4 and 5, to bring the second anvil of the series into operative alinement with the fastener inserting tool 12. It is to be noted that although the space interval between any pair of adjacent anvils may be varied at random, the straight face 82 will always serve to stop the successive anvil members, as they are indexed, in correct alinement with the tool 12, and the tapered face 80, when in contact with the adjacent anvil member, will always exert a clockwise force upon said anvil to hold the other adjacent anvil in alined position against the face 82 of the member 66. It is also to be noted (Fig. 2) that the bottom of the member 66 moves in a plane closely adjacent to the top of the work holder plate 24, so that the work holder is securely held on the turntable 30 even during the automatic rearward withdrawal of the member 66 (Fig. 4). Consequently, after a fastener has been inserted in each fastener receiving location on the work piece, the handle 78 is manually moved rearwardly against the force of the spring 76 to retract fully the member 66 (as illustrated by the dotted lines of Fig. 3) and thereby permit the work holder to be removed from the machine.

The starting and automatic stopping of the machine operation is controlled by two microswitches each connected in parallel with the solenoid which, when energized, engages the machine clutch. The first switch 84 (Fig. 1) is constructed to provide a normally open switch circuit. This switch is manually operated temporarily to close its circuit to the solenoid and thus initiate the operation of the machine by engaging the clutch that drives the power shaft 18. The second microswitch 86 is designed to provide a normally closed switch circuit for keeping the clutch-engaging solenoid energized after the operator has released the manual switch 84 to restore it to its normally open circuit condition. The second switch 86 is shifted to open circuit position (Fig. 3) by the clockwise movement of a lever 88 affixed to the lower end of a pivotally mounted rock shaft 90 having also affixed thereto at its upper end a control lever having a forwardly extending arm 92 disposed adjacent the peripheral edge of the turntable 30, and having a rearwardly extending arm 94, the purpose of which will be explained herein following. When the machine is in the at rest position (Fig. 3), the circuit to the solenoid through the switch 86 is maintained in open condition, the levers 88 and 92 having previously been rocked clockwise to the positions shown by the abutting engagement of a projecting ear 96 formed on the side of the turntable 30. During the operation of the machine and while the ear 96, by reason of rotation of the turntable 30, is not in camming engagement with the forward end of the lever 92 (Fig. 5), the levers 88 and 92 are free to assume their normal counterclockwise position wherein the end of the lever 92 rests against the circumferential wall of the turntable 30, and the lever 88 allows the switch 86 to move forwardly into its normally closed position so that the machine continues to perform one cycle after another until the rotation of the turntable 30 has once more brought the ear 96 into camming engagement with the forward end of the lever 92, thereby to rock the levers 88 and 92 clockwise and depress the switch 86 causing the opening of the circuit through the switch 86 to the solenoid. Even though the solenoid is deenergized as soon as the ear 96 contacts the lever 92, the construction of the clutch mechanism is such that the disengagement of the clutch and consequent stopping of the machine will not be effected until the completion of that machine cycle during which the clutch control rod was released by the opening of the circuit through the switch 86. That is to say, although the ear 96 is designed to engage the end of the lever 92 and to rock it clockwise before the last required machine cycle has been completed, to bring the machine to the at rest position of Fig. 3, the drive imparted to the power shaft 18 will not be immediately disconnected, but will continue to operate the machine to finish the insertion of the last of the series of fasteners required to be set in the work piece, whereupon the machine will automatically stop in its at rest position. Referring to Fig. 3, it will be noted that in the at rest position the ear 96 is disposed within a complementary notch 98 formed in the adjacent portion of the lever 92. As will now be explained, the retaining notch 98 prevents accidental rotation of the turntable 30 as a result of manual movement by an operator while removing or installing the work holder. A safety feature, to prevent the accidental displacement of the turntable and consequent starting of the machine operation during the changing of work pieces, is the requirement that in order to effect such a change the detent member 66 must be fully retracted, by the operator moving the handle 78 rearwardly, to withdraw the tapered nose clear of the plate 24 (as illustrated by the dotted lines of Fig. 3). When thus retracted, a slide 100, secured to the rear of the member 66, and carrying a cam face 102, is drawn rearward until the cam face 102 is brought into wedging engagement with an abutment 104 on the rear of the switch control lever 94. The cam face 102, when manually moved rearward into engagement with the abutment 104 prevents any shifting of the switch control lever such as might release the ear 96 from within the notch 98, so that, while a work piece is being changed, there is no chance for the turntable to be shifted or for the machine to commence operation.

The automatic sequence of machine operation is as follows. Assuming the machine to be in its inoperative or at rest position, the operator moves the handle 78 rearwardly whereupon the detent member 66 is retracted so that the holder with a preloaded work piece thereon may be inserted upon the turntable 30, and at the same time the turntable is locked against accidental rotation in either direction by pressure, between the cam face 102 and the abutment 104, acting upon the lever 92 to retain the ear 96 within the notch 98. After the holder has been located with respect to the eccentric pin 34, the handle 78 is released, and the force of the spring 76 moves the detent member 66 to the forward position, as illustrated in Fig. 3, wherein, as an aid to the following operation description, certain adjacent anvil members 22 have been designated respectively as members A, B and C. With the tapered nose of the member 66 wedged between members B and C, the work piece is oriented to receive the first fastening which is to be inserted upon the member B which, in the inoperative position of the machine, is in alinement with the then retracted setting tool 12. The operator next depresses the starting switch 84 to engage the driving clutch for the power shaft 18. The tool 12 presents and sets a fastener in the work piece above the anvil member B. At the same time and while the member 66 is holding the work holder against rotation, the cam 62 moves the frictional driving clutch member 44 to its counterclockwise position (Fig. 4); whereupon the cam 64 causes the detent or motion-limiting member 66 to be retracted rearwardly a sufficient amount to be clear of the rotational path of the anvil members. A clockwise indexing of the turntable 30 and of the work holder is next produced, by the action of the cam 62, as soon as the forward end of the straight face 82 is removed from contact with the member B (Fig. 4). During the indexing movement of the work holder the setting tool 12 has been elevated into operative engagement with the raceway 10 to pick up another fastener, and the motion-limiting member 66, now acting in response to the spring 76, has again moved forward so that its nose enters between the anvil members A and B with the tapered face 80 of the member 66 acting as a cam against the member B to complete the indexing movement of the first cycle of the machine operation, and to bring the anvil member A into locked alinement with the tool 12 as illustrated in Fig. 5. It is to be noted that, before the completion of the above described first cycle of the machine operation, the resultant indexing of the turntable has moved the ear 96 well out of contact with the lever arm 92, thereby allowing the lever to rock counterclockwise and close the circuit to the solenoid through the switch 86. Therefore, the energization of the clutch-controlling solenoid is taken over by the switch 86 before the cyclical phase at which the clutch would normally disengage to stop the machine. From the foregoing it will be understood that the operator need not manually depress the switch 84 beyond the period of time necessary to engage the clutch and initiate operation of the machine. Since the circuit through the switch 86 is now closed, the machine will continue without interruption to repeat the foregoing described cyclical operations until the last anvil member C has been indexed into alinement with the tool 12, and all the fasteners required have been inserted into the work piece. During this last cycle of the machine the ear 96 will again engage the lever arm 92 to open the circuit through the switch 86 and to stop the machine in the at rest position of Fig. 3.

Having described my invention, what I claim as new and desire to secure by Letters Patent of the United States is:

1. In a machine adapted to insert fasteners one at a time in a work piece having a series of variously spaced apart points at which the fasteners are required to be located, the combination with a power operated fastener inserting tool of: a movable work holder for supporting the work piece and for intermittently moving the work piece to locate successively each of said points in operative alinement with the tool; frictional drive means for yieldably moving the work holder and work piece in a path adapted to carry each of said points successively into and out of operative alinement with the tool; and a motion limiting detent intermittently movable into and out of abutting engagement with pairs of detent receiving faces provided on the work holder at spaced apart intervals, said detent, when engaged with any of said pairs of faces, acting to lock the work holder against further movement by said drive means.

2. A fastener inserting machine adapted to set one at a time a series of fasteners in a work piece having a series of preformed apertures at variously spaced apart intervals for the reception of said fasteners, comprising: a power actuated fastener setting tool mounted for reciprocable movement in a fixed operative path; a movable work holder provided with a series of anvil members each adapted to register with one of the apertures; a motion limiting wedge slidably mounted for reciprocable movement transverse to the path of said tool and adapted, when projected toward the work holder, to enter between any two adjacent anvil members until both members are in abutting engagement with opposite sides of the wedge whereupon the work holder becomes locked in one operative position where one of the anvil members and the corresponding aperture are in axial alinement with the setting tool; and yieldable drive means intermittently acting upon the work holder tending to shift said one of the anvil members and corresponding aperture out of said operative position and to move the work holder to a second operative position where the next adjacent anvil member and its corresponding aperture will be locked in axial alinement with said tool.

3. A fastener inserting machine adapted to set one at a time a series of fasteners in a work piece having a series of preformed apertures at variously spaced apart intervals for the reception of said fasteners, comprising: a power actuated fastener setting tool mounted for reciprocable movement in a fixed operative path; a movable work holder provided with a series of anvil members each adapted to register with one of the apertures; a motion limiting wedge slidably mounted for reciprocable movement transverse to the path of said tool and adapted, when projected toward the work holder, to enter between any two adjacent anvil members until both members are in abutting engagement with opposite sides of the wedge whereupon the work holder becomes locked in one operative position where one of the anvil members and the corresponding aperture are in axial alinement with the setting tool; and power means actuated in timed relation to the operative strokes of the setting tool for retracting the wedge after each stroke of the tool, then shifting the work holder a distance sufficient to allow the wedge to enter the next adjacent space between the anvil members, then projecting the wedge into said space to lock the work holder.

References Cited in the file of this patent

UNITED STATES PATENTS

| 401,708 | Maxim | Apr. 16, 1889 |
| 2,652,167 | Havener | Sept. 15, 1953 |
| 2,807,175 | Tandler et al. | Sept. 24, 1957 |

FOREIGN PATENTS

| 725,191 | Great Britain | Mar. 2, 1955 |